May 19, 1970  K. SMITH  3,512,345
REEL-TYPE LAWN RAKE

Filed Dec. 12, 1966  2 Sheets-Sheet 1

Kenneth Smith
INVENTOR.

BY Clarence A. O'Brien
and Harvey B. Jacobson
Attorneys

May 19, 1970  K. SMITH  3,512,345
REEL-TYPE LAWN RAKE
Filed Dec. 12, 1966  2 Sheets-Sheet 2
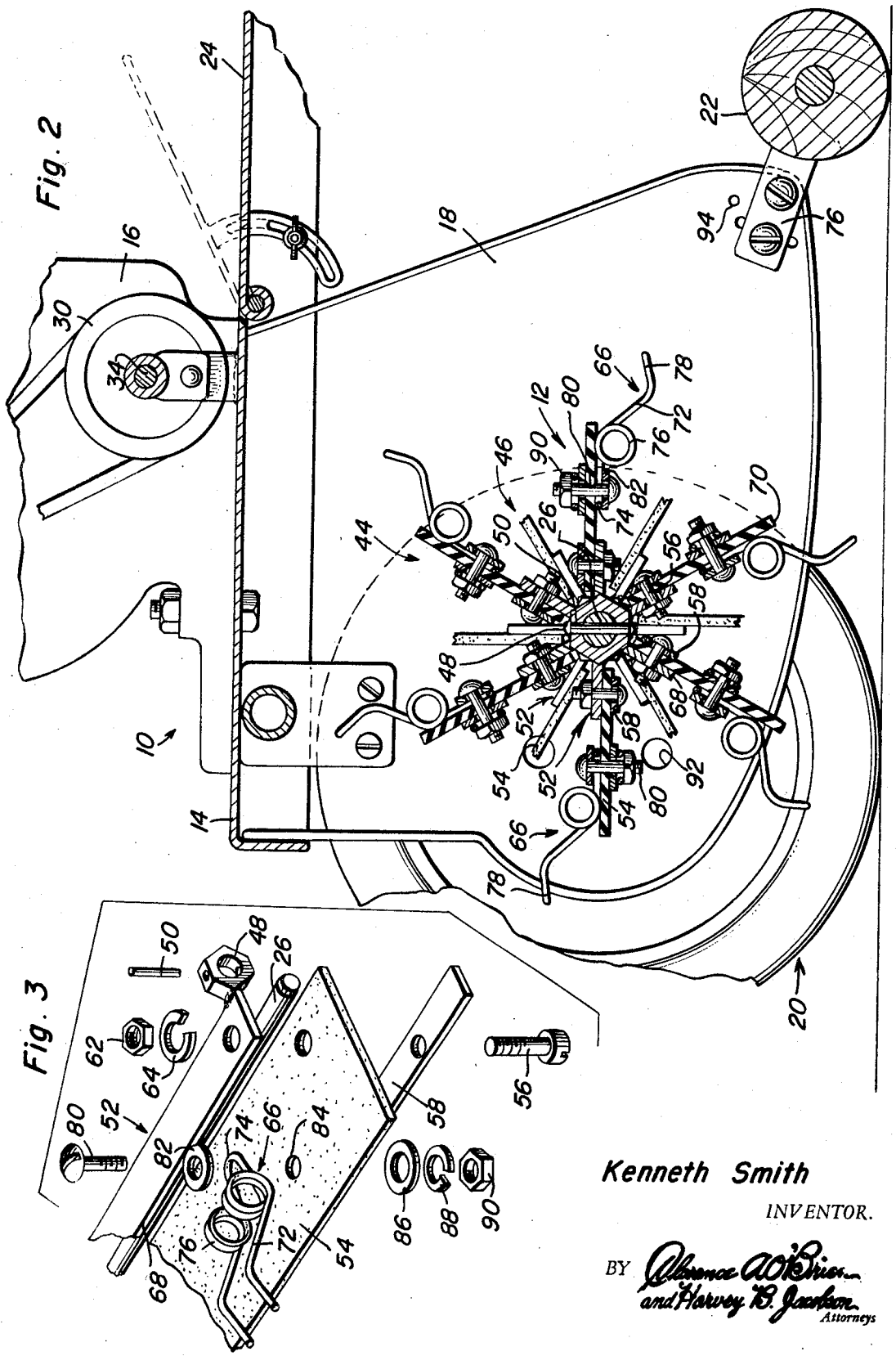
Kenneth Smith
INVENTOR.
BY Clarence A. O'Brien
and Harvey B. Jackson
Attorneys

United States Patent Office 3,512,345
Patented May 19, 1970

3,512,345
REEL-TYPE LAWN RAKE
Kenneth Smith, 2122 Peake Ave., Cody, Wyo. 82414
Filed Dec. 12, 1966, Ser. No. 600,882
Int. Cl. A01d *51/00, 77/00*
U.S. Cl. 56—27
9 Claims

ABSTRACT OF THE DISCLOSURE

A lawn rake having a power driven reel comprising three reel sections mounted on and driven by a single shaft. Each section is rotatably offset from the adjacent section and includes a plurality of raking tines fixed thereto through a resilent mount.

---

The instant invention is generally concerned with a reel-type lawn rake, and more particularly relates to a reel for such a rake.

It is a primary object of the instant invention to provide a reel for a power lawn rake which combines superior operation with structural durability.

In conjunction with the above object, it is also a significant object of the instant invention to provide a power rake which will effectively remove all debris, including grass clippings, twigs, leaves, litter, etc.

Likewise, it is an important object of the instant invention to provide a device wherein a plurality of raking tines are provided so as to produce the desired raking effect, in conjunction with a unique means whereby the tines are mounted in a manner so as to allow a degree of flexure in the unit sufficient to avoid the excessive breakage of the tines normally associated with reel-type rakes.

Further, an important object of the instant invention resides in the provision of a reel-type lawn rake wherein a substantially complete coverage of the ground along the path of movement of the machine is effected.

Also, it is an object of the instant invention to provide a reel specifically constructed so as to provide a balanced unit during the operation thereof.

Basically, the invention in order to achieve the above objects, comprises a reel mounted for vertical adjustment on a motor carrying hand or power driven chassis. The reel itself includes a single elongated power driven shaft upon which a plurality of reel sections are mounted, each section incorporating a plurality of mounting plates fixed to the shaft for rotation therewith, a plurality of resilient mounting panels fixed to the plates, and a plurality of double-tine raking members fixed to the panels for raking engagement with ground supported debris upon a rotational driving of the shaft. The resilient nature of the mounting panels insures a desired degree of flexibility which, while not detracting from the raking effectiveness of the tines, and in fact improving thereon, provides a highly efficient means for avoiding breakage of the tines as frequently experienced in conventional rigidly mounted tines. The efficiency of the reel is further enhanced by rotationally offsetting the mounting plates of the center of the three reel sections relative to the aligned plates in the end sections so as to produce a balanced shaft and an even pull on the machine. Likewise, the tines on every other panel of each section are longitudinally offset approximately one-half the tine spacing so as to strike the debris between the tines of the two adjacent panels.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a cross-sectional view taken substantially on a plane passing along line 2—2 in FIG. 1; and FIG. 3 is a partial exploded perspective view of various ones of the elements used in the construtcion of the reel.

Figure 1:
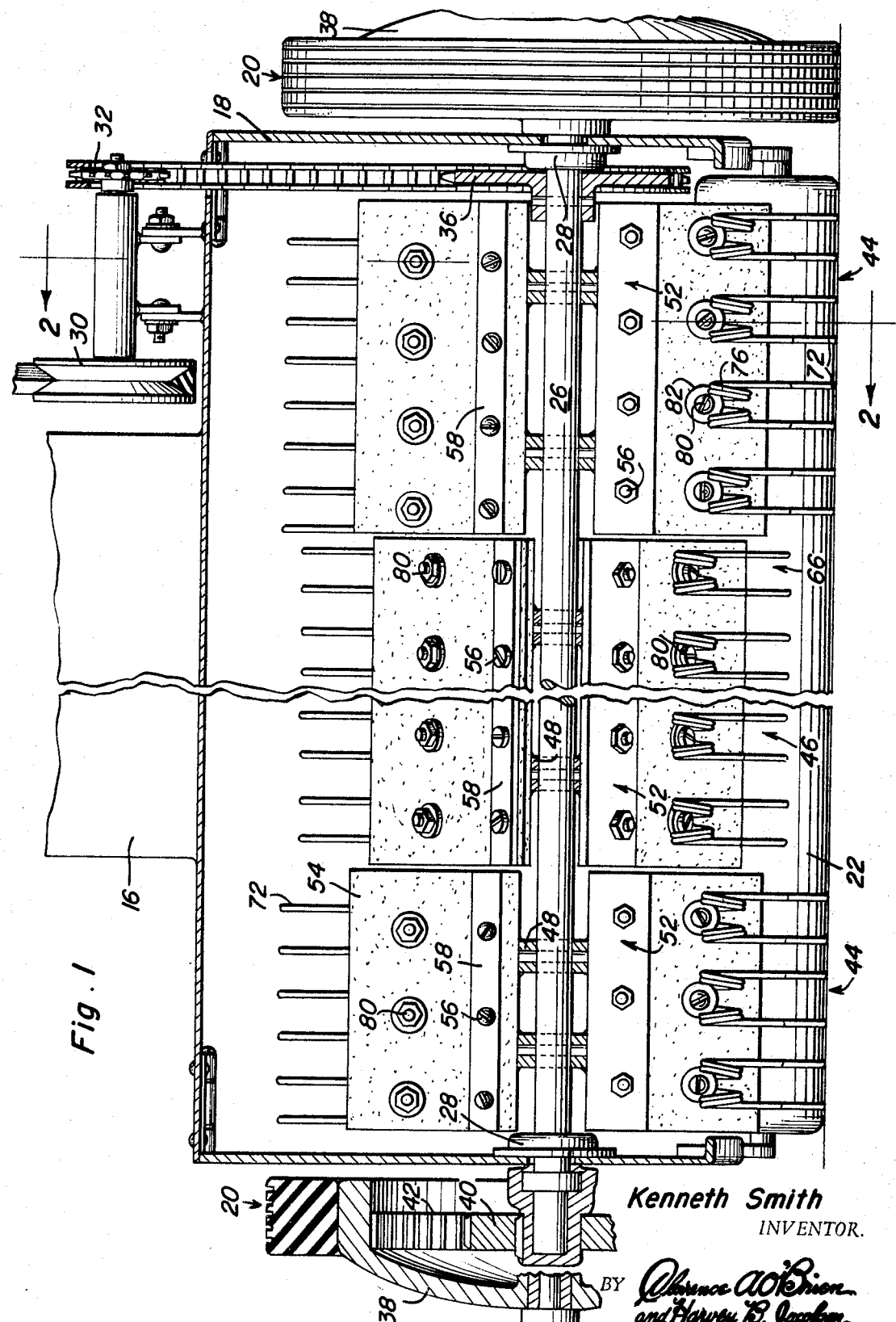
FIG. 1 is an enlarged transverse cross-sectional view through a lawn rake with the reel of the instant invention mounted thereon.

Referring now more specifically to the drawings, reference numeral 10 is used to generally designate the power lawn rake comprising the instant invention. This rake 10, in addition to the reel 12, includes a deck 14 upon which the power unit or motor 16 is mounted, a pair of opposed side panels 18 upon which the front wheels 20 and rear roller 22 are mounted for vertical adjustment, and a rear debris directing flap 24.

The reel 12 comprises an elongated center shaft 26 rotatably mounted on the opposed side walls or panels 18 by suitable bearing units 28. This shaft 26 is to be rotatably driven by the motor 16 through a power train which includes a pulley 30, belt driven from the drive shaft of the motor 16, a gear 32 fixed to the sleeve supported shaft 34 of the pulley 30 for rotation therewith, and an enlarged gear 36 fixed to the shaft 26 toward one end thereof and chain driven from the gear 32. At this point, it might be noted that the forward movement of the rake might be effected either manually, assisted by the natural tendency of the rotating reel to propel the apparatus forward, or mechanically as suggested in FIG. 1. In this latter instance, the opposite ends of the shaft 26 will project into the wheel housings 38 with these outer ends of the shaft 26 each having a gear 40 keyed thereon and drivingly engaged with an internal gear 42 fixed to the interior of the wheel housing 38 whereby a simultaneous driving of the reel 12 and wheels 20 will be effected. It should of course be appreciated that any suitable clutch means can also be incorporated into the rake 10 as in a conventional reel-type lawn mower.

Referring again to the reel 12, it is contemplated that such is to include two substantially equal length end sections 44 and a central section 46 of a length generally equal to the combined length of the two end sections 44. The shaft 26 is common to all of the sections which are mounted longitudinally thereon. Basically, each section, 44 and 46, includes a plurality of smooth bore hexagonal mounting nuts 48 suitably keyed or pinned to the shaft 26 by keys 50. The set of mounting nuts 48 associated with each of the reel sections are laterally aligned with each other and mount six flat elongated mounting plates 52 which are welded to the six exterior corners defined about the nuts 48, thereby positioning a radially orientated mounting plate 52 at spacings of 60 degrees about the shaft 26.

Each of the mounting plates 52 in turn has a substantially wider flat elongated panel 54 rigidly affixed thereto and projecting laterally outward therefrom. These panels 54 are to be of a suitable resilient material, such as rubber belting, which, while flexing upon the introduction of a substantial resistance to the movement thereof upon a rotation of the reel, will normally maintain the unflexed planar orientation thereof illustrated in the drawings due to a degree of relative rigidity therein. The actual mounting of each of the panels 54 is effected by a plurality of mounting bolts 56 extending through a clamping bar or plate 58 which overlies the inner edge portion of the corresponding panel 54 which in turn overlies the mounting plate 52, the bolts 56 extending through the relatively narrow clamping bar 58, the inner edge portion of the panel 54 and suitable apertures 60 in the mounting plate 52 itself. An appropriate nut 62 and, if desired, lock washer 64 will of course be associated with each of the bolts 56. It will be appreciated that a positive and rigid affixing of each of the panels 54 to the associated mounting plate 52 is effected along the full length thereof through the use of the full length clamping bar 58.

Each of the resilient panels 54 in turn mounts a plurality of raking members 66 thereon in outwardly spaced relation to the outer edge 68 of the associated mounting plate 52, the raking members 66 projecting laterally or radially beyond the outer edge 70 of the panel 54 for raking engagement with the ground or debris located thereon.

Each of the raking members 66 includes a pair of substantially parallel tines 72 interconnected by an arcuate bight portion 74 with each of the tines 72 having two spring producing convolutions 76 defined therein immediately forward of the bight portion 74. Forward of the corresponding two convolutions 76, each tine projects upwardly out of the plane of the bight portion at an angle of substantially 45 degrees, terminating in a forwardly directed debris engaging outer end portion 78 generally paralleling the bight portion of the member 66. With reference to FIG. 2, it will be noted that the convolutions 76 are generally located at the outer edge portion of the corresponding panel 54 with the remainder of each of the tines 72 projecting outwardly therefrom. The actual mounting of each of the raking members 66 on the corresponding panel 54 is effected by means of an elongated bolt 80 extending through a first washer 82 which overlies the bight portion 74 of the raking member 76, through an aperture 84 in the panel 54, through a washer 86 underlying the panel 54, through a suitable lock washer 88, and into threaded engagement with an appropriate nut 90.

Referring to FIG. 1, attention is directed to the fact that it is contemplated, with regard to each section, the raking members 66 on every other mounting panel 54 be longitudinally offset so as to have the tines 72 thereon fall in a plane centrally between the tines 72 associated with the adjacent mounting panels 54. In this manner, assuming a tine spacing of ¾", a tine will strike the ground approximately every ⅜", thereby effecting a substantially complete coverage.

Further, noting FIGS. 1 and 2, it is contemplated that the mounting plates 52 of the center section 46 be rotated approximately 30 degrees relative to the mounting plates 52 of the two aligned end sections 44, this being simply effected by so mounting the mounting nuts 48. In FIG. 2, the plate and panel units of the center section 46 have been broken off for purposes of clarity. This offsetting of the center section 46 acts to balance the shaft 26 and avoid any tendency for an undesirable twisting thereof, in addition to providing for an even pulling through an engagement with the debris being raked in that the outer two sections 44 will simultaneously engage alternatively with the engagement of the elongated central section 46.

The complete device 10 will normally have a removable grass catcher mounted in any suitable manner to the rear thereof for the reception of the raked debris, the adjustable shield or deflector 24 being appropriately positioned for a directing of the raked debris into the catcher. The adjustment of the shield 24 can be effected in any suitable manner, such as the particular manner clearly illustrated in FIG. 2. Further, it is contemplated the vertical position of the reel 12 be variable, this being effected through a change in the vertical position of the support wheels 20 and rear roller 22. The drawings illustrate one manner of providing for this vertical adjustment, such comprising the provision of a plurality of mounting holes 92 and 94 for the wheels 20 and roller mounting lugs 96.

In use, upon a rotational driving of the shaft 26, the raking members 66 will be selectively brought into raking engagement with the ground or debris thereon in a manner so as to rearwardly throw the debris. A certain degree of resiliency is introduced into each of the raking tines 72 through the spring producing convolutions 76 integrally formed therein whereby a rearward flinging of the debris is facilitated. Further, each of the raking members 66 is specifically secured to a rigid mounting plate 52 through a resilient mounting panel 54 consisting, in most instances, of relatively rigid rubber belting such as would normally maintain the tines in positive raking position until such tines contact a relatively immovable object, such as a rock, sprinkler head, or the like. This resilient mount for the raking tines is deemed particularly significant in that the excessive breakage associated with the provision of rigid mounts for tines, even those tines which incorporate an inherent resiliency therein, has been, as shown by actual experimentation, substantially completely eliminated. With regard to this resilient mounting of the raking members 66, it will be noted that, as best seen in FIG. 2, a substantial free area is provided laterally between the outer edge of the mounting plate and the point at which the individual raking member 66 is bolted to the panel 54, thus insuring the desired flexing upon the encountering of an object too heavy to be rearwardly raked without damage to the raking tines 72. The structural rigidity of the panels 54 is of course so related to that of the tines 72 as to enable a resilient flexing of the panels 54 prior to a damaging deformation of the tines 72.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. A power rake, said rake including a reel, said reel comprising a rotatably mounted elongated shaft, a plurality of elongated mounting plates paralleling said shaft, means fixing said plates to said shaft at equally spaced points thereabout and in generally radial extending orientation relative thereto, a flat resilient panel paralleling each mounting plate, each panel being of a greater width than the plates and including an edge portion thereof overlying the corresponding mounting plate with the remainder of the panel projecting laterally outward of the plate, means fixing each panel to the corresponding plate along the length thereof, and a plurality of independent raking members on each panel at spaced points along the length thereof, each raking member comprising a pair of laterally spaced parallel tines interconnected at one end by an integral bight portion, each raking member being fixed to the corresponding panel in laterally spaced relation outward of the corresponding mounting plate by securing means engaged with the bight portion and through the panel, each raking member projecting laterally outward beyond the corresponding panel for raking contact with the ground, each panel providing a flexing mount for the raking members mounted thereon whereby a rearward movement of a raking member will result upon encountering a relatively immovable object.

2. The rake of claim 1 wherein the tines on each of said raking members include spring producing convolutions between the outer ends thereof and the bight portion connected ends thereof, the spacing between each raking member being substantially the same as that between the individual tines of a raking member, the raking members associated with every other mounting plate being longitudinally offset a distance generally equal to one half the tine spacing relative to the raking members on the adjacent mounting plates.

3. In a power rake, a reel, said reel including a rotatably mounted elongated shaft, a plurality of longitudinally oriented independent reel sections, said shaft being common to all of said sections, each section comprising a plurality of elongated mounting plates paralleling said shaft, means affixing said plates to said shaft at equally spaced points thereabout and in generally radial extending orientation relative thereto, a flat resilient panel paralleling each mounting plate, each panel being of a greater width than the plates and including an edge portion thereof overlying the corresponding mounting plate with the remainder of the panel projecting laterally outward of the plate, means fixing each panel to the corresponding plate along the length thereof, a plurality of raking members fixed to each panel at spaced points along the length thereof, each raking member being fixed to the corresponding panel in laterally spaced relation outward of the corresponding mounting plate, each raking member projecting laterally outward beyond the corresponding panel for raking contact with the ground, each panel providing a flexing mount for the raking members mounted thereon whereby a rearward movement of a raking member will result upon encountering a relatively immovable object, the mounting plates, and associated panels and raking members, of each section being circumferentially offset from those of the adjoining section or sections, said sections constituting two generally equal length end sections and central section approximately equal to the combined length of the end sections, said means fixing each panel to the corresponding plate comprising an elongated clamping bar overlying the edge portion of the panel which overlies the mounting plate, and a plurality of bolts extending through the bar, mounting plate, and edge portion of the panel sandwiched therebetween, the means fixing each plate to the shaft comprising a plurality of hexagonal nut-like members slidably received on said shaft, key means locking said hexagonal members to said shaft, and welding intimately securing the inner edge of said plate to the outer peripheries of said hexagonal members.

4. The rake of claim 3 wherein the mounting plates and associated panels of said two end sections are in longitudinal alignment with each other, said central section being circumferentially offset relative to said end sections a distance approximately one half the circumferential distance between the mounting plates on the end sections.

5. The rake of claim 2 wherein the tines of each raking member, outward of the spring producing convolutions therein, are laterally offset out of the plane of the panel to which the member is fixed.

6. The rake of claim 3 wherein each of said raking members comprises a pair of laterally spaced parallel tines interconnected at one end by an integral bight portion, the fixing of each raking member to the corresponding panel being effected by means of a securing member engaged with the raking member bight portion and through the panel.

7. The rake of claim 6 wherein the tines on each of said raking members include spring producing convolutions between the outer ends thereof and the secured bight portion connected ends thereof, the spacing between each raking member being substantially the same as that between the individual tines of a raking member, the raking members associated with every other mounting plate being longitudinally offset a distance generally equal to one half the tine spacing relative to the raking members on the adjacent mounting plates.

8. In a power rake, a reel, said reel including a rotatably mounted elongated shaft, a plurality of longitudinally oriented independent reel sections, said shaft being common to all of said sections, each section comprising a plurality of elongated mounting plates paralleling said shaft, means affixing said plates to said shaft at equally spaced points thereabout and in generally radial extending orientation relative thereto, a flat resilient panel paralleling each mounting plate, each panel being of a greater width than the plates and including an edge portion thereof overlying the corresponding mounting plate with the remainder of the panel projecting laterally outward of the plate, means fixing each panel to the corresponding plate along the length thereof, a plurality of raking members fixed to each panel at spaced points along the length thereof, each raking member being fixed to the corresponding panel in laterally spaced relation outward of the corresponding mounting plate, each raking member projecting laterally outward beyond the corresponding panel for raking contact with the ground, each panel providing a flexing mount for the raking members mounted thereon whereby a rearward movement of a raking member will result upon encountering a relatively immovable object, said sections constituting two aligned generally equal length end sections and a central section circumferentially offset relative to said end sections a distance approximately one-half the circumferential distance between the mounting plates on the end sections, the length of the central section being approximately equal to the combined length of the two end sections, the means fixing each plate to the shaft comprising a plurality of nut-like members slidably received on said shaft, key means locking said nut-like members to said shaft, and welding intimately securing the inner edge of said plate to the outer peripheries of said nut-like members.

9. The rake of claim 8 wherein each raking member comprises a pair of laterally spaced parallel tines interconnected at one end by an integral bight portion, each raking member being fixed to the corresponding panel by bolt-like securing means engaged with the bight portion and extending through the panel, the tines on each of said raking members including spring producing convolutions between the outer ends thereof and the secured bight portion connected ends.

References Cited

UNITED STATES PATENTS

| 2,505,576 | 4/1950 | Reitan | 56—27 |
| 2,959,904 | 11/1960 | Ferris | 56—27 |
| 3,112,593 | 12/1963 | Ronning | 56—27 X |
| 3,217,474 | 11/1965 | Neilson | 56—27 |
| 3,331,195 | 7/1967 | Heth et al. | 56—27 X |

RUSSELL R. KINSEY, Primary Examiner

U.S. Cl. X.R.

56—400